Figure 1:
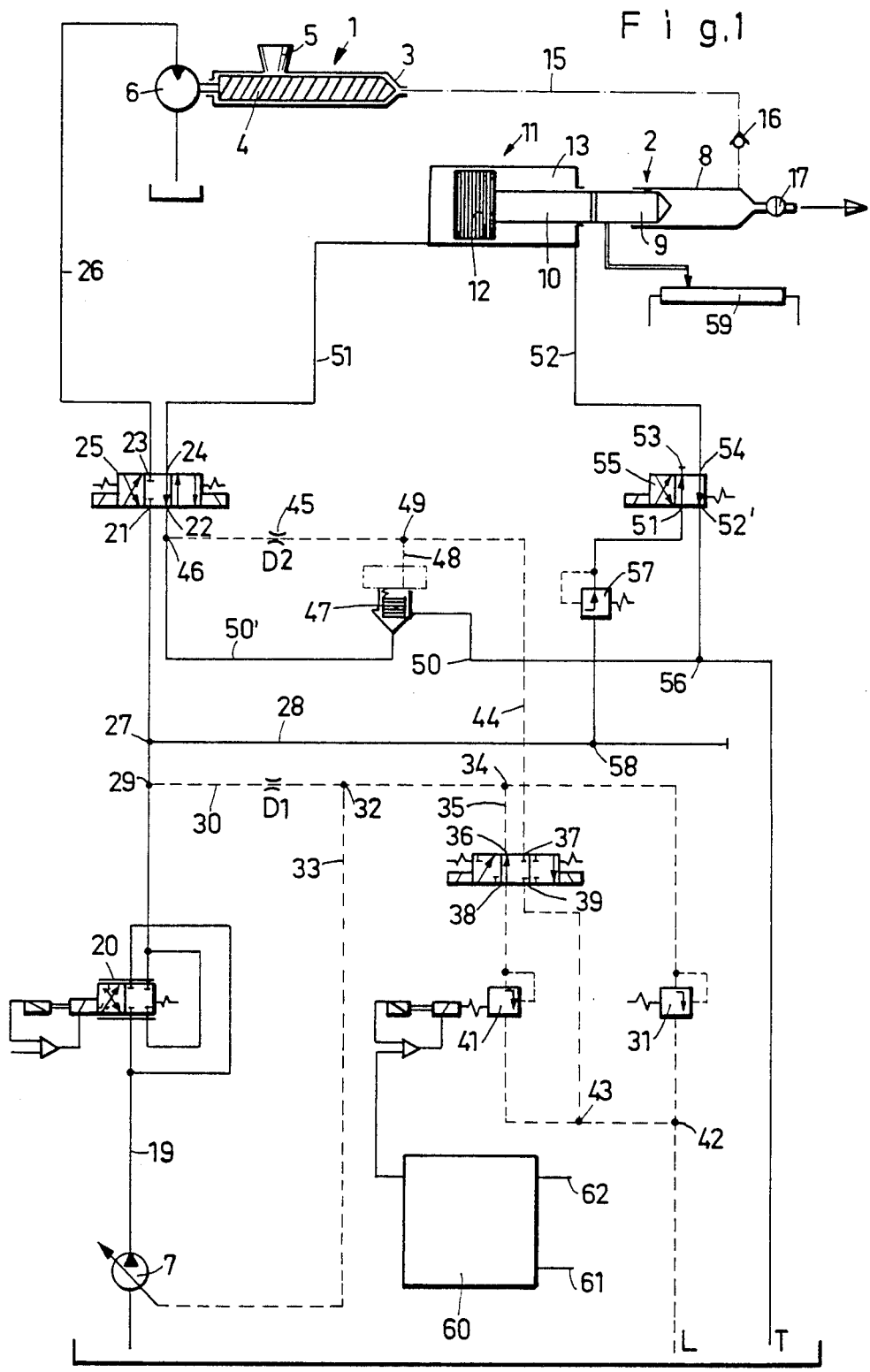

United States Patent [19]

von der Ohe et al.

[11] Patent Number: 4,632,651
[45] Date of Patent: Dec. 30, 1986

[54] HYDRAULICALLY CONTROLLED EXTRUDER INJECTION MOLDING UNITS FOR THE PROCESSING OF RUBBER

[75] Inventors: Helmcke von der Ohe, Achim-Uesen; Wolfgang Koliwer, Achim, both of Fed. Rep. of Germany

[73] Assignee: Klöckner-Werke Aktiengesellschaft, Duisburg, Fed. Rep. of Germany

[21] Appl. No.: 617,279

[22] Filed: Jun. 4, 1984

[30] Foreign Application Priority Data

Jun. 7, 1983 [DE] Fed. Rep. of Germany ....... 3320520

[51] Int. Cl.$^4$ ........................................... B29C 45/77
[52] U.S. Cl. .................................. 425/135; 264/403; 264/405; 425/145; 425/149; 425/542
[58] Field of Search .............. 425/135, 149, 145, 143, 425/542, DIG. 223; 264/40.3, 40.1, 40.5, 328.2, 328.3, 328.4

[56] References Cited

U.S. PATENT DOCUMENTS

| | | | |
|---|---|---|---|
| 3,148,231 | 9/1964 | Spencer | 425/135 |
| 3,932,083 | 1/1976 | Boettner | 425/145 |
| 4,135,870 | 1/1979 | Wallace | 425/145 |
| 4,207,047 | 6/1980 | Kolb et al. | 425/149 |
| 4,208,176 | 6/1980 | Salerno | 425/149 |
| 4,256,678 | 3/1981 | Fujita et al. | 425/145 |
| 4,325,896 | 4/1982 | Rodgers, Jr. | 425/149 |
| 4,426,341 | 1/1984 | Tsuzuku et al. | 425/149 |

*Primary Examiner*—Jay H. Woo
*Assistant Examiner*—Timothy W. Heitbrink
*Attorney, Agent, or Firm*—Watson, Cole, Grindle & Watson

[57] ABSTRACT

Disclosed is a hydraulically controlled extruder injection molding unit which includes a measured value pick-up for the position of the piston rod of the working cylinder and/or of the injection piston. A pressure control valve which can be switched on is provided in the line leading to the surge chamber of the working cylinder for the piston. A proportionally controlled pressure valve is provided in the line to the other surge chamber, the value being controlled as a function of dropping control values when switching from subsequent pressure to dynamic pressure until the measured value pick-up emits an output signal. The then existing instantaneous value of the dynamic pressure is then added to the preselected dynamic pressure. Consequently, the dynamic pressure phase takes place under a corrected dynamic pressure.

7 Claims, 2 Drawing Figures

HYDRAULICALLY CONTROLLED EXTRUDER INJECTION MOLDING UNITS FOR THE PROCESSING OF RUBBER

The subject invention relates generally to a hydraulic control for extruder injection molding units used in the processing of rubber, and more particularly to such units including a plasticization unit driven by a hydromotor, an injection molding unit having a hydraulic working cylinder, and a hydraulic pump for the hydromotor and the working cylinder which is controlled in dependence on the injection molding pressure and/or the injection molding speed, the subsequent pressure and the dynamic pressure.

Extruder injection molding units for the processing of rubber generally include an extruder for the plasticization of the rubber to be processed. The plasticization in the extruder is effected under a given dynamic pressure so that the rubber to be plasticized is heated due to the creation of frictional work. Since rubber mixtures have, independently of the elastomer, a certain reaction or vulcanization temperature, care must be taken such that this temperature is not exceeded during plasticization. However, in practice, efforts are made to keep the mass temperature of the rubber mixture close to the vulcanization temperature in order to utilize short heating cycles. Experience has shown that a temperature increase or a reduction of 10 degrees C. in the rubber substance results in a decrease or extension of the vulcanization time by about 50%. Thus it is absolutely necessary to maintain the temperature of the rubber substance constant during the plasticizing so that defined processing conditions are reached.

After plasticization, the plasticized rubber is then injected into a mold by means of injection pressure and subsequent pressure and vulcanized. It is customary, in general, for the extruder to transport the plasticized rubber into an injection cylinder whereafter it is injected into the mold by means of an injection piston. In some cases, the extruder injection molding unit is designed such that a worm takes over the function of the plasticizing as well as the function of the injection.

The problems described below are experienced in all extruder injection molding units so that the subject invention is applicable to all extruder injection molding units. While there are generally no problems involved in presetting and maintaining the injection pressure and the subsequent pressure, problems do arise with the dynamic pressure. Due to the oppositely directed axial movement of the injection piston or of the worm in the dynamic pressure phase in comparison with the injection and subsequent pressure phase, some plasticized rubber substance enters and remains in the ring slot defined by the worm or by the injection piston and the inner wall of the injection cylinder and this rubber substance that remains is vulcanized into a film during the injection and subsequent pressure phase. Thereafter, when plasticizing additional rubber, undefined operating conditions develop since the pressure rises necessarily on the rubber substances to be plasticized until the vulcanized film tears in the ring slot. Consequently, the dynamic pressure phase takes place under a dynamic pressure which was not exactly the same as that preset in advance. The frictional work increases necessarily with a rising pressure and thus so does the temperature of the plasticized rubber such that, in particularly unfavorable cases, vulcanization begins prematurely.

Additional difficulties arise due to the fact that, after each injection cycle, i.e., after the termination of the subsequent pressure phase, the vulcanized film formed in the ring slot is not necessarily identicical to those of the preceding and following injection cycles with regard to its dimensions and properties, The differences in the succeeding vulcanized films are due, in part, to the operation temperatures of the extruder injection molding unit which are constantly subject to slight changes. As a result, by presetting a constant pressure for several cycles, the dynamic pressure actually building up in the extruder is, in general, a variable value. As a consequence of all of the above, these complex interactions require that the operating personnel of the extruder injection molding unit have considerable experience in order to be able to successfully operate these units.

An object of the present invention is therefore to provide a hydraulic control means of the type previously mentioned which takes into account these changing influences caused by the vulcanized films formed in the ring slot so that the dynamic pressure phase during plasticization takes place under a constant dynamic pressure which can be provided in advance.

In accordance with the invention, this object is achieved by means of a measured value pick-up for measuring the position of the piston assembly, a pressure control valve which can be switched on a line leading to the surge chamber of the working cylinder for the piston return, a pressure valve which is proportionally controlled and can be switched on a line leading to the other surge chamber, a control system for the control of the proportionally controlled pressure valve as a function of dropping control values, the system adding the instantaneous value of the dynamic pressure to the preselected dynamic pressure as a correcting dimension with a change of the output signal on the measured value pick-up. Thus the dynamic pressure phase is conducted under the correct dynamic pressure.

After the subsequent pressure phase is terminated, the switched-on pressure control valve passes into the operating position and makes connection between the other surge chamber of the working cylinder and the pressure connecting line. For this purpose, a sufficiently high maximum pressure is set. At the same time, the surge chamber of the working cylinder is connected with a drain connection line whereby the pressure is set in advance by the pressure set on the proportionally controlled pressure valve which is controlled by its control system in the sense of dropping control values. With a differential pressure between surge chambers of the working cylinder dependent on the vulcanized film, the piston is shifted with the piston rod. At the same time, the output signal of the measured value pick-up changes which is then supplied to the control system. The pressure difference existing with the change of this signal leads to the control system adding this pressure difference as a correcting value to the preset dynamic pressure. As a result, the rubber substance to be plasticized by the extruder is plasticized under a defined dynamic pressure.

More specifically, the following processes take place during operation of the controlled unit. At the beginning of the dynamic pressure phase, the control system controls the proportionally controlled pressure valve in the sense of dropping pressure values. At a certain pressure difference on both sides of the piston of the working cylinder which is dependent on the vulcanized film, the piston starts to move. This pressure differences is equal to the correcting value and is is added to the hydraulic pressure under which the hydraulic operating means is in the other surge chamber. This corrected pressure is, so to speak, the corrected hydraulic dynamic pressure. This results in the dynamic pressure of the plasticized substance by the multiplication with the transmission ratio of the two piston surfaces of the piston of the injection cylinder.

The invention is exemplified in greater detail in the drawing with the aid of the following description and the accompanying drawing.

Figure 2:
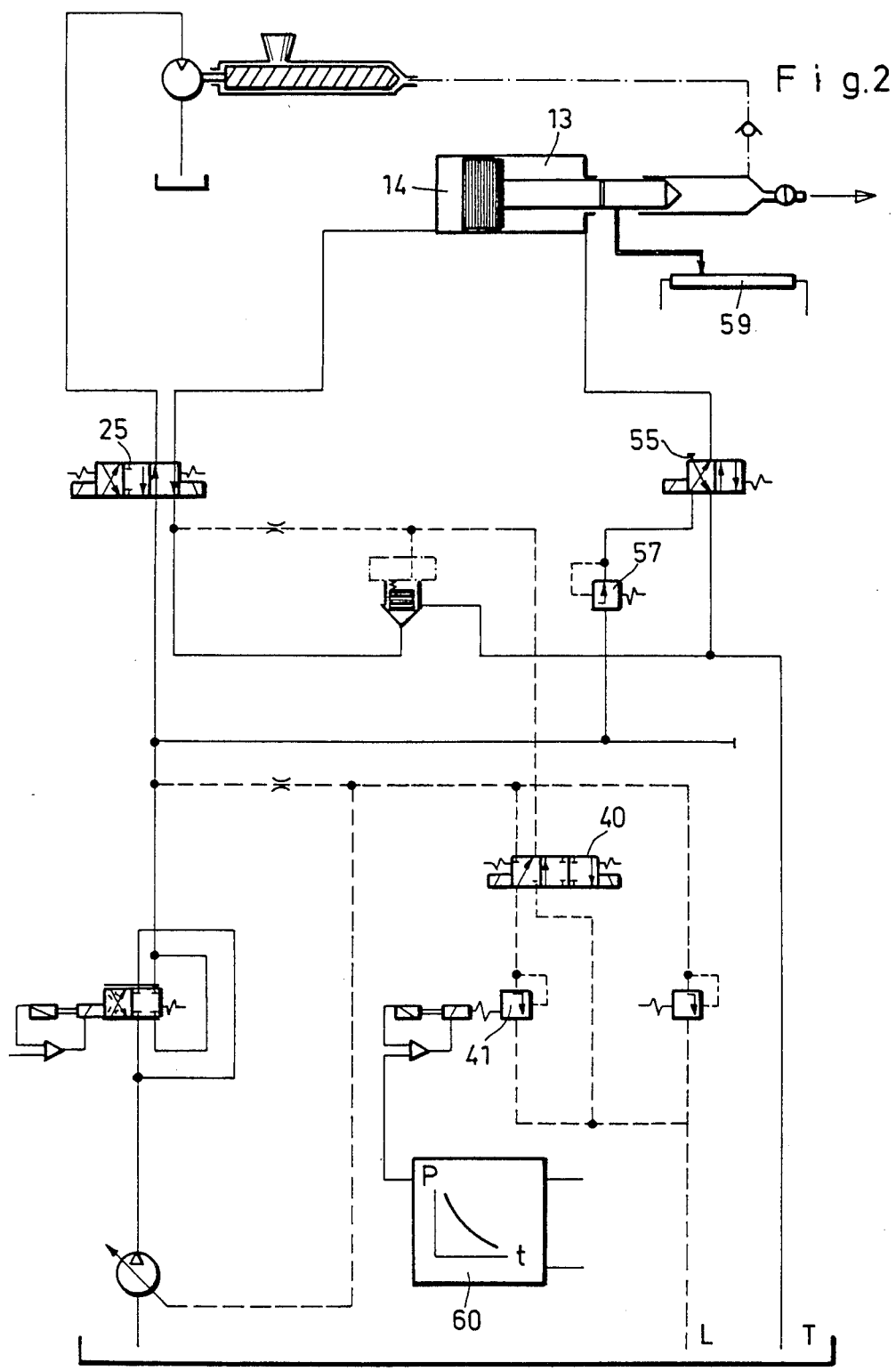

In the drawing,

FIG. 1 illustrates an embodiment of an extruder injection molding unit of the invention having one extruder and one injection unit; and FIG. 2 illustrates the embodiment of FIG. 1 with the switch position of the valve set to determine the correcting value at the beginning of the dynamic pressure phase.

The extruder injection molding unit of the drawing comprises plasticization unit 1 and injection unit 2. Plasticization unit 1 includes worm 4 rotatably mounted in cylinder 3 to which the rubber substance to be plasticized is supplied through funnel 5. Worm 4 is driven by hydromotor 6 on which controlled pump 7 acts. Controlled pump 7 is controlled as a function of the injection pressure and subsequent pressure.

Injection unit 2 comprises injection cylinder 8 and working cylinder 11 which confine piston assembly including injection piston 9, piston rod 10 and piston 12. Injection piston 9 is guided in injection cylinder 8 in an axially moveable manner. Injection piston 9 is connected to piston rod 10 of working cylinder 11 whose piston 12 together with the walls of the working cylinder defines the surge chambers 13 and 14 (see FIG. 2). Injection cylinder 8 is connected with the plasticization unit 1 by line 15 having check valve 16. Injection cylinder 8 additionally has stop valve 17. During the plasticizing of the rubber substance, plasticized material is transported by rotating worm 4 into injection cylinder 8 with check valve 16 being open and stop valve 17 being closed which causes injection piston 9 to move to its left final position of the drawing. When the dynamic pressure phase is terminated, valve 17 is opened and the plasticized rubber substance is injected into a mold (not shown) in the direction of the arrow, check valve 16 being closed by the increasing injection pressure.

Line 19 leads from controlled pump 7 through proportional valve 20 to inlet 21 of 4/3-way valve 25. First outlet 23 of valve 25 leads through line 26 to hydromotor 6. Pressure connection line 28 is connected in line 19 at branch 27 between proportional valve 20 and 4/3-way valve 25.

Between proportional valve 20 and branch 27, another branch 29 is provided in line 19 for control line 30 which leads to the tank L through pressure relief valve 31. Control line 33 leads to controlled pump 7 from branch 32 between branch 29 and pressure relief valve 31. An additional branch 34 is provided between branch 32 and pressure relief valve 31 which is connected with first inlet 36 of 4/3-way valve 40 through line 35. First outlet 38 of 4/3-way valve 40 is connected with the inlet of a proportionally controlled pressure valve 41 and branch 42 which is connected with second outlet 39 of 4/3-way valve 40. Second inlet 37 of 4/3-way valve 40 leads to the third outlet 22 of 4/3-way valve 25 through line 44 and throttle 45. Between outlet 22 and throttle 45 is branch 46 which leads to pressure relief valve 47 through line 50' whose control line 48 is connected with branch 49 between the throttle 45 and inlet 37 in line 44. Drainage line 50 of pressure relief valve 47 leads to the tank.

Second drain 24 of 4/3-way valve 25 is connected with surge chamber 14 of working cylinder 11 through line 51. Surge chamber 13 of working cylinder 11 for the piston return is connected by line 52 with second outlet 54 of 4/2-way valve 55 whose first outlet 53 is blocked. Third outlet 52' of 4/2-way valve 55 is connected with branch 56 in drainage line 50 of pressure relief valve 45. Inlet 51 of 4/2-way valve 55 is connected with branch 58 in pressure connecting line 28 through pressure control valve 57.

Injection piston 9 or piston rod 10 of piston assembly are connected with measured value pick-up or path measuring system 59 which can be, for example, an absolute angle step transmitter which is connected with the piston assembly by means of a gear train.

The system for the control of the proportionally controlled pressure valve 41 is shown schematically at 60 in which a pressure curve is stored according by which the preliminary control pressure changes in accordance with a previously set time function. The output of measured value pick-up 59 is connected with input 61 of control system 60. This control system 60 has additionally input 62 for the rated value of the dynamic pressure.

FIG. 2 shows the position of the valves for the determination of the correcting value for the dynamic pressure at the beginning of the dynamic pressure phase. A given defined pressure prevails in surge chamber 13 by the switched position of 4/2-way valve 55 and the set pressure at pressure control valve 57. By means of the switched position of 4/3-way valve 25 and of 4/3-way valve 40 and by having given a preset maximum initial value for the pressure at proportionally controlled pressure valve 41, the pressure corresponding to the aspect ratio prevails initially in surge chamber 14. Thus, the pressures in surge chambers 13 and 14 are preset such that the piston is in a resting position. Then, the control pressure is continuously decreased at the advance-controlled pressure relief valve until the piston starts to move axially. This changes the output signal of measured value pick-up 59 with the result that control system 60 picks up the recorded instantaneous value of the pressure in surge chamber 14 and adds it as the correcting value to the dynamic pressure given as the rated value. The dynamic pressure phase then takes place under the corrected dynamic pressure. The determination of the correcting value is effected at the beginning of each cycle of dynamic pressure phase for the extruder injection molding unit.

It is claimed:

1. A hydraulically controlled extruder injection molding unit for processing rubber substances comprising a plasticization unit driven by a hydromotor for plasticizing said rubber substances at a dynamic pressure, an injection molding unit having a hydraulic working cylinder and a piston assembly, said hydraulic working cylinder and piston assembly defining two surge chambers, a first chamber for driving said piston assembly at an injection molding pressure and at a subsequent pressure and a second chamber for return of said piston assembly, a hydraulic pump for activating said hydromotor and said hydraulic working cylinder, said hydraulic pump controlled in dependence of one or more control valves, said control valves comprising injection molding pressure, injection speed of said piston assembly, said subsequent pressure and said dynamic pressure and hydraulic control means comprising a measured value pick-up means for measuring a position of said piston assembly, a pressure control valve capable of being switched on a line leading to said second surge chamber of said hydraulic working cylinder for said piston return, a pressure valve which is proportionally controlled and is capable of being switched on a line leading to said first surge chamber, and a control system for the control of the proportionally controlled pressure valve, said control system capable of adding an instantaneous value of said dynamic pressure to a preselected dynamic pressure as a correcting dimension upon a change of an output signal from said measured value pick-up means whereby plasticization of said rubber substances occurs under a corrected dynamic pressure.

2. An extruder injection molding unit according to claim 1 wherein said plasticization unit is an extruder having a worm.

3. An extruder injection molding unit according to claim 1 wherein said measured value pick-up means measures a position of a piston rod of said piston assembly.

4. An extruder injection molding unit in accordance with claim 1 wherein said measured value pick-up means measures a position of an injection piston of said piston assembly.

5. An extruder injection molding unit in accordance with claim 1 wherein said pressure control valve is switched on line by a 4/2-way valve.

6. An extruder injection molding unit in accordance with claim 1 wherein said proportionately controlled pressure valve is switched on line by a 4/3-way valve.

7. An extruder injection molding unit in accordance with claim 6 wherein said proportionately controlled pressure valve is switched on line by two 4/3-way valves.

* * * * *